Dec. 1, 1970        L. R. BAKER        3,544,796
LENS CENTERING INSTRUMENT
Filed July 7, 1967        3 Sheets-Sheet 1
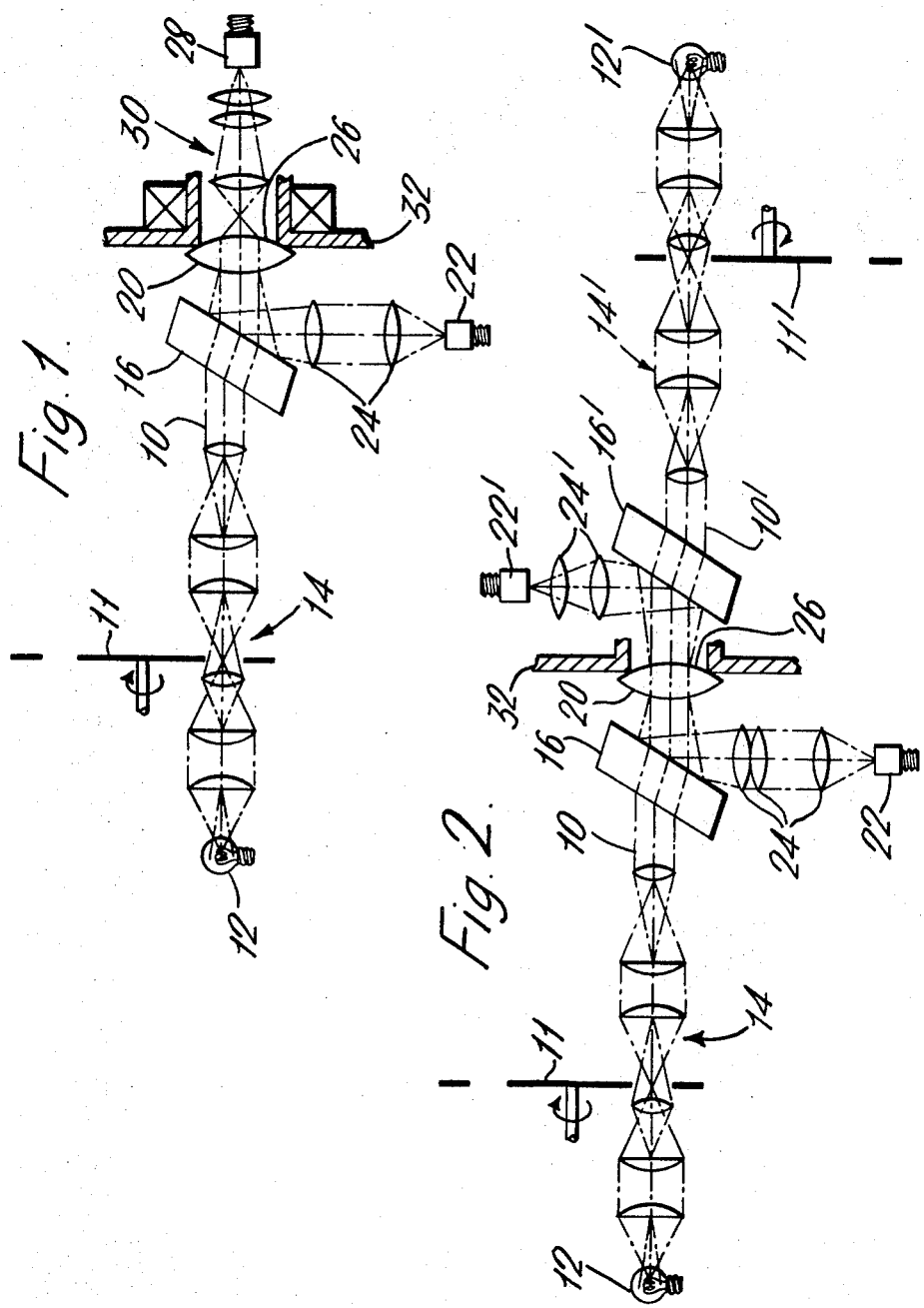
Inventor
Lionel Richard Baker
by Watson, Cole, Grindle & Watson
Attorneys

United States Patent Office 3,544,796
Patented Dec. 1, 1970

3,544,796
LENS CENTERING INSTRUMENT
Lionel Richard Baker, Chislehurst, England, assignor to British Scientific Instrument Research Association, Chislehurst, Kent, England, a British company
Filed July 7, 1967, Ser. No. 651,749
Claims priority, application Great Britain, July 11, 1966, 31,082/66
Int. Cl. G01b *19/29;* H01j *39/12*
U.S. Cl. 250—201   12 Claims

ABSTRACT OF THE DISCLOSURE

A lens centering apparatus consisting of a rotatable holder in which the lens to be tested is mounted. A light beam is directed onto one or both surfaces of the lens and the light reflected from and/or transmitted through a surface is detected by a position sensitive photocell. If the lens is not correctly centred the image in the transmitted or reflected light beam will appear to move on rotation of the lens and the signal from the position sensitive photocell is fed to a proportional servo control arrangement which adjusts the position of the lens in the holder until the image no longer is displaced.

---

This invention relates to apparatus for centering a lens and to apparatus for detecting decentering errors in lenses.

In the specification, the mechanical axis M means the axis of the cylindrical edge of a lens, the optical axis O means the line joining the centers of curvature of the two radiation transmitting or reflecting surfaces of a lens and the rotary axis R means the axis defined by rotation of rotatable means for holding the lens. If one lens surface is plane the optical axis is the line normal to the plane surface and passing through the center of curvature of the surface of finite radius. A curved surface of a lens is said to be centered with respect to an axis, such as rotary axis, when its center of curvature lies on that axis.

In the production of lenses it is necessary to get the mechanical axis of the lens coincident with its optical axis to ensure that the optical axis is correctly aligned when the lens is seated in a mounting. This coincidence (which may be referred to as M–O coincidence) is achieved by machining the edge of the lens while the lens is rotated about its optical axis. A further need, therefore, is to bring the optical axis into coincidence with the rotary axis (O–R coincidence) before machining starts.

It has been proposed to achieve O—R coincidence in a lens by fixing the lens to a rotatable annular holder with pitch or other adhesive which will become yieldable when warmed, the holder having been first adjusted so that its mechanical axis is coincident with its rotary axis. The holder is rotated and the image or images reflected from one or both surfaces is observed. A reflected image will rotate as long as the optical axis does not coincide with the rotary axis. The adhesive is warmed and the lens repositioned manually until the image or images appear stationary on rotation of the holder. The adhesive is then allowed to harden and the lens edge can then be machined to give M–O coincidence. Centering accuracy depends largely on the skill and patience of the operator and in addition the lens may be damaged while manually adjusting its position on the holder.

Another technique has been proposed for quantity production when no more than ordinary centering tolerances are specified but it is only suitable for the more steeply curved lens surfaces. Two cup or bell shaped holders, coaxial and facing each other, are brought together and hold the lens between them, making contact with the spherical surfaces of the lens. This causes the optical axis of the lens to align itself with the axis of the holders. The holders are then rotated about their common axis, and the lens edge is machined while the lens is held between the holders. However, there is always a danger of surface damage to the lens from its contact with the holders.

According to one aspect of the invention there is provided a lens centering apparatus comprising a source of electromagnetic radiation, means for directing a beam of said radiation onto a surface of a lens to be centered, means for mounting the lens to be centered, said mounting means being rotatable, means for receiving a beam of radiation transmitted through and/or reflected from said surface and adapted to produce a signal in response to movements of the transmitted and/or reflected beam of radiation, means for adjusting the position of the lens in the holder and proportional servo control means controlling the operation of the adjusting means in response to signals from said receiving means.

The receiving means is preferably a position sensitive photocell or similar photoelectric device for detecting image displacements. When there is no movement of the image recorded by the receiving means O–R coincidence has been achieved and the lens can then be machined for M–O coincidence.

It is quite possible to detect both reflected and transmitted beams simultaneously. In addition both lens surfaces can be centered practically simultaneously either by using one source of radiation and detecting image displacements by reflection from the first surface and by transmission through both surfaces, or else by using two sources of radiation and detecting image displacements by reflection from both surfaces.

Specific embodiments of the invention will now be described by way of example with reference to the accompanying drawings in which:

FIG. 1 shows diagrammatically an arrangement for centering a lens using only one light source.

FIG. 2 shows diagrammatically an arrangement for centering a lens using two light sources.

Figure 3A:
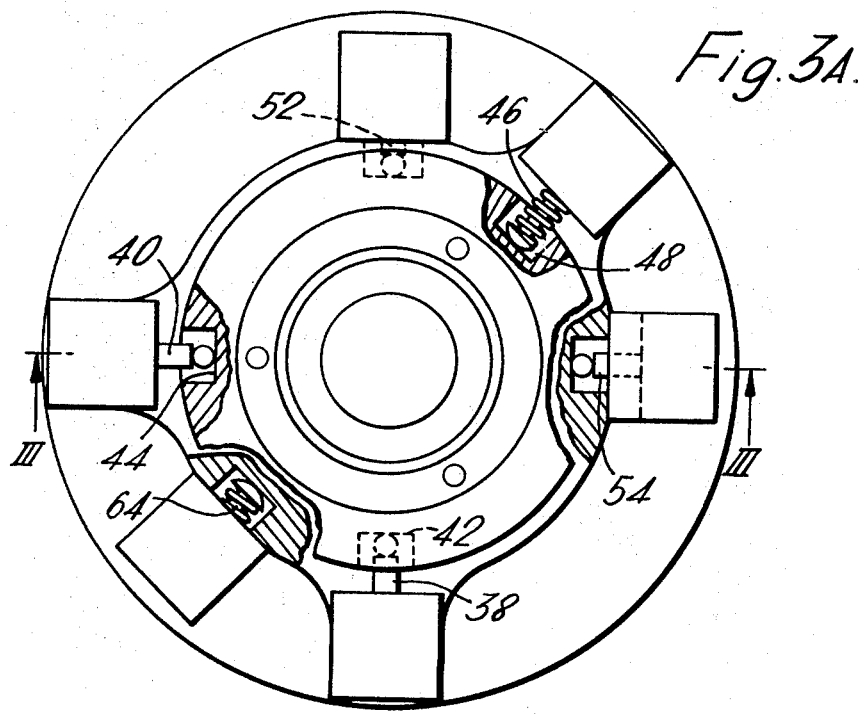
FIG. 3A shows in horizontal section a preferred arrangement for mounting a lens to be centered.
Figure 3B:
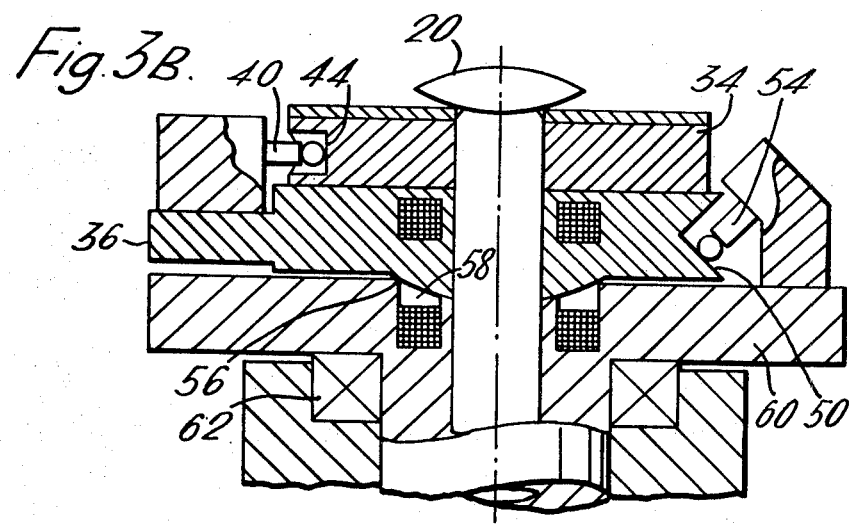
FIG. 3B is a section on the line III—III of FIG. 3A.

Referring to FIG. 1 a light beam 10 is directed from a source 12 through a lens system 14 and beam splitter 16 onto a lens to be centered 18. Light reflected from surface 20 of the lens is reflected by the beam splitter onto a position sensitive photocell 22 through a lens system 24. Light transmitted through both surface 20 and the other surface 26 of the lens produces an image which is directed onto a second position sensitive photocell 28 by lens system 30. Then lens is mounted on a rotatable holder 32 and rotation of the holder will cause movements of the images which are detected by the photocells 22, 28 if the lens is not correctly centered. A chopper 11 is provided at an appropriate position in the lens system so that the photocells will produce an AC signal output modulated by movement of the image. Signals derived from the photocells are fed to means for adjusting the position of the lens on the holder (not shown) and the lens is thus automatically repositioned until O–R coincidence is achieved. The lens systems can be used to accommodate the optical effect of the power of different lens surfaces. The transmitted beam detects that decentering exists, whether on either one or both the surfaces. The reflected beam detects any decentering of the surface it is monitoring. If, for example, the transmitted beam reports that decentering exists and the reflected beam reports that the near surface is centered, then it must be the far surface which is still decentered and the control system responds accordingly.

FIG. 2 illustrates an arrangement in which a lens is centered by reffection off both surfaces there being two light sources and two reflection channels. Each reflection channel is the same as the reflection channel shown in FIG. 1. However, the two choppers preferably have different carrier frequencies to avoid any stray correlation between the two channels.

In order to position the lens in the holder in response to signals from the photocells an adjustable platform as shown in FIGS. 3A and B may be used. A lens to be centered 20 is fixed, for example by adhesive, to block 34 which is slidably disposed on a tiltable member 36. Two piezoelectric tranducers 38, 40 are positioned so as to act in recesses 42, 44 formed in the edge of the block in directions at right angles to each other. The piezoelectric transducers cause the block 34 to be displaced with relation to the member 36 in response to signals from the photocells. A spring loaded plunger 46 engages in a recess 48 formed in the edge of the block, the spring loaded plunger urging the block towards the transducers 38 and 40.

The member 36 is provided with chamfered edges, as shown at 50. Two further piezoelectric transducers 52 and 54 are positioned so as to act on the chamfered edges and the side of the member remote from the block is provided with a partially spherical surface 56 which rests on the edges of a recess 58 formed in a hub 60. The hub 60 is mounted for rotation in a bearing 62. Movement of one or both of the piezoelectric transducers 52, 54 in response to signals from the photocells causes the member 36 to tilt with respect to the hub 60. A spring loaded plunger 64 engages a chamfered edge of the member 36 so as to urge the member into engagement with the transducers 52, 54.

The axis of rotation of the mounting arrangement is vertical so that the block member and hub tend to be held in position by gravity. Alternatively springs (not shown) may be provided for this purpose. Electromagnets are provided in the member and the hub in order to retain the block, member and hub together. However, during centering electromagnets are de-energized so that the block is free to slide on the member and the member free to tilt on the hub. The sliding surfaces of the bolck, member and hub may be lubricated, for example with air and/or may be provided with a coating of a material having a low coefficient of friction, for example polytetrafluorethylene. When the lens has been centered the electromagnets are energized to clamp the block member and hub together.

The lens may be fixed to the block by any suitable adhesive, such as a resin, or by any other suitable means such as vacuum or mechanical clamping. The piezoelectric transducers may be replaced by motor driven screws or by any other suitable means such as any mechanical, thermal, electromechanical, hydraulic, pneumatic or magnetic means or combination thereof.

Figure 4:
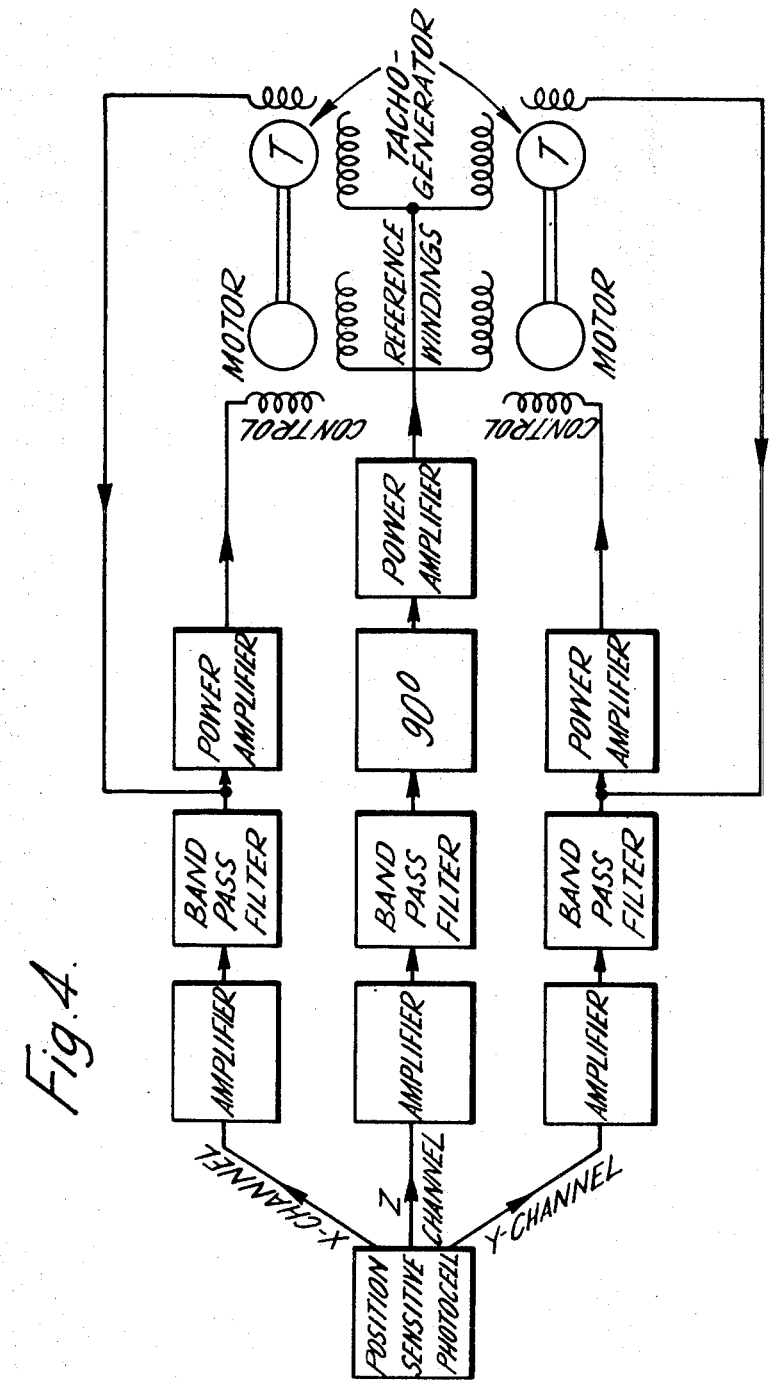
FIG. 4 is a preferred control circuit for adjusting the position of a lens in response to detected image displacements.

An example of a servo-control circuit for adjusting the platform is shown in FIG. 4. The circuit shown is designed for use with motor driven screws for moving the block and the tiltable member.

The position sensitive photocell provides two AC signals representing decentering along X and Y co-ordinates, and a reference signal shown as a Z channel. The signals energize the respective motors whereby the screws move the platform until there is no output along the X or Y channels from the photocell. In the circuit shown each motor is provided with a tachometer generator and the signals therefrom are used as feed back to control motor operation. Since the gain of the X and Y channels depends on the optical power of the lens surfaces under consideration, automatic or manual adjustment of gain may be provided. Manual or automatic switching means may be provided so that using the arrangement shown in FIG. 1, either the reflection-channel photocell controls the tilt transducers and the transmission channel photocell controls the displacement transducers or the reflection-channel photocell controls the displacement transducers and the transmission-channel photocell controls the tilt transducers.

The basic concept of the invention may be used to measure the decentering errors of lenses. Thus, if O–R coincidence of a lens is established, gauges may be applied to the edge of the lens as it rotates to give an output, for example in the form of two amplitudes and a phase difference which indicates lack of M–O coincidence as a spatial vector. Such an output may be displayed or recorded. In another aspect of the invention M–R coincidence may be established first, in which case there would be no output from the gauges, and the outputs from the photocells then indicate lack of O–M coincidence.

What I claim is:

1. A lens centering apparatus for centering two surfaces of a lens so that the optical axis of the lens is aligned along a predetermined axis, comprising; a source of electromagnetic radiation, means for directing a beam of said radiation at said lens to be centered, means for mounting the lens on said predetermined axis, means for receiving radiation transmitted from said lens and for generating signals indicative of the amount that both surfaces of said lens are decentered, means for adjusting the position of the lens in said mounting means, said adjusting means including means for tilting said lens at an angle to the path of said radiation and means for shifting said lens transverse to said predetermined axis and proportional servo control means controlling the operation of said tilting and shifting means in response to signals from said receiving means to center the two surfaces of said lens so that the optical axis thereof is aligned with said predetermined axis.

2. A lens centering apparatus as claimed in claim 1 wherein said receiving means includes first position-sensitive means for receiving radiation transmitted through said lens and generating signals indicating the amount that one surface of the lens is decentered and second position-sensitive means for receiving radiation reflected from the other lens surface and generating signals indicative of the amount that said other surface of the lens is decentered.

3. A lens centering apparatus as claimed in claim 2 wherein said first and said second position sensitive means each include a single position-sensitive photocell which generates signals indicating that a respective lens surface is displaced from that image position representing the centered position of the respective lens surface from which said image is produced.

4. A lens centering apparatus as claimed in claim 3, wherein each position-sensitive means generates first and second signals representative of the displacement of the image received by said position-sensitive means along two mutually perpendicular coordinates.

5. A lens centering apparatus as claimed in claim 1 wherein said receiving means includes first position sensitive means for receiving radiation reflected from one lens surface and second position sensitive means for receiving radiation reflected from the other lens surface, and said apparatus further comprising a second source of electromagnetic radiation and additional means for directing radiation from said second source onto the other surface of said lens.

6. A lens centering apparatus as claimed in claim 5 wherein said first and said second position-sensitive means each include a single position-sensitive photocell which detects displacement of an image along two mutually perpendicular coordinates.

7. A lens centering apparatus as claimed in claim 1, further comprising means for chopping said radiation beam so that said receiving means produces an AC signal.

8. A lens centering apparatus as claimed in claim 1, wherein said mounting means includes a rotatable hub, a member mounted on said hub and tiltable by said tilting means with respect to the axis of rotation of said hub, a block mounted on said member for holding said lens and slidable by said shifting means in a direction substantially perpendicular to the axis of rotation of said hub.

9. A lens centering apparatus for centering the surfaces of a lens so that the optical axis of the lens is aligned along a predetermined axis, comprising; a first source of radiation, a first optical system for projecting a beam of radiation from said first source to one surface of a lens to be centered, a first beam-splitter interposed between said source and said lens to be centered, a first position-sensitive photocell located to receive an image reflected from said one surface of said lens and said beam-splitter to generate signals representative of the amount by which said one surface is decentered, a second source of radiation, a second optical system for projecting a beam of radiation from said second source to the other surface of the lens to be centered, a second beam-splitter interposed between said second source and said other surface of the lens to be centered, a second position-sensitive photocell located to receive an image reflected from said other surface of said lens and said second beam-splitter to generate signals representative of the amount by which said other surface is decentered, and servo-control means responsive to the signals generated by said first and second position-sensitive photocells to move said lens so that its optical axis is aligned with said predetermined axis.

10. Apparatus according to claim 9 wherein said first and second radiation sources, said first and second optical systems and said first and second beam-splitters are all aligned on said predetermined axis and said servo-control means includes a hub for mounting said lens on said predetermined axis, means for shifting said hub transverse to said predetermined axis, means for tilting said hub at an angle to said predetermined axis, and a servo-mechanism for controlling said tilting and shifting means in response to the signals generated by said first and second position-sensitive photocells.

11. A lens centering apparatus for centering the surfaces of a lens so that the optical axis of the lens is aligned along a predetermined axis, comprising; a source of radiation, an optical system for projecting a beam of radiation from said source to one surface of a lens to be centered, a beam-splitter interposed between said source and said lens to be centered, a first position-sensitive photocell located to receive an image reflected from said one surface of said lens and said beam-splitter to generate signals representative of the amount by which said one surface is decentered, a second position-sensitive photocell located on the opposite side of said lens than said source for receiving radiation transmitted through said lens to generate signals representative of the amount by which said other surface is decentered, and servo-control means responsive to the signals generated by said first and second position-sensitive photocells to move said lens so that its optical axis is aligned with said predetermined axis.

12. Apparatus according to claim 11 in which said servo-control means includes, a hub for mounting said lens, means for shifting said hub transverse to said beam of radiation, means for tilting said hub at an angle to said beam of radiation, and a servo-mechanism for controlling said tilting and shifting means in response to the signals generated by said first and second position-sensitive photocells.

References Cited
UNITED STATES PATENTS

| | | | |
|---|---|---|---|
| 3,445,665 | 5/1969 | Laughman | 250—208 |
| 2,352,179 | 6/1944 | Bolsey | 356—127 X |
| 3,364,813 | 1/1968 | McKinney | 356—167 |

JAMES W. LAWRENCE, Primary Examiner

E. R. LAROCHE, Assistant Examiner

U.S. Cl. X.R.

250—208, 224, 234; 356—127, 152, 167